United States Patent [19]

Gunnell et al.

[11] 4,162,286
[45] Jul. 24, 1979

[54] WET PELLETER HAVING VARIABLE ANNULUS BETWEEN SHELL AND SHAFT

[75] Inventors: Thomas J. Gunnell; Paul D. Hann, both of Bartlesville, Okla.

[73] Assignee: Phillips Petroleum Company, Bartlesville, Okla.

[21] Appl. No.: 870,681

[22] Filed: Jan. 23, 1978

[51] Int. Cl.² ............................................. C09C 1/56
[52] U.S. Cl. .................... 264/117; 425/222; 422/242; 422/256
[58] Field of Search ............... 425/222; 264/117; 23/259.5–259.8, 252 R

[56] References Cited

U.S. PATENT DOCUMENTS

| | | | |
|---|---|---|---|
| 2,920,344 | 1/1960 | Stirling | 425/222 |
| 2,984,860 | 5/1961 | Thomas | 425/222 |
| 3,161,707 | 12/1964 | Stirling | 264/117 |
| 3,579,717 | 5/1971 | Middlebrooks | 425/222 |
| 3,674,437 | 7/1972 | Austin et al. | 23/252 R |

Primary Examiner—Robert L. Spicer, Jr.

[57] ABSTRACT

A wet pelleting apparatus essentially comprises a cylindrical shell and a shaft having pelleting pins affixed thereto, usually in a helical arrangement. In cross-sectional area taken at right angles to the axis of the shaft which is substantially concentrically disposed within the shell, the annulus formed between the shaft and the configuration given to it and the shell inner wall and the configuration given to it decreases and increases as the plane of cross-section is moved from the feed end of the apparatus to the discharge end thereof. In one embodiment, the shaft has an undulating or repetitive hourglass configuration and the inner wall of the shell is rectilinear. In another, the inner wall of the shell can be given an undulating configuration. In a third, both the wall and shaft surfaces can be formed so as to cause, according to the invention, alternate compression and decompression of particles being pelleted. The invention is described in connection with the wet pelleting of carbon black with water.

14 Claims, 5 Drawing Figures

WET PELLETER HAVING VARIABLE ANNULUS BETWEEN SHELL AND SHAFT

This invention relates to wet pelleting of particles, e.g., carbon black. In one of its aspects it relates to a method of wet pelleting of particles, e.g., carbon black. In another of its aspects it relates to a wet pelleter device suitable for pelleting particles, e.g., carbon black.

In one of its concepts the invention provides a method of wet pelleting particles, e.g., carbon black, for example to densify the same, by passing the carbon black particles under conditions agitation together with a pelleting fluid, e.g., water, through successive zones of compression and decompression. In another of its concepts the invention provides an apparatus for wet pelleting particles, e.g., carbon black, the apparatus comprising essentially a cross-sectional area taken at right angles to the axis which alternately decreases and then increases as the plane of the cross-section is moved from the feed toward the discharge end of the apparatus. More specifically, according to a concept of the invention, the shaft of a pelleter, which may be equipped with the usual pelleting tines, is provided with an undulating surface, more fully descirbed herein. In another more specific concept of the invention the inner wall of the pelleter is provided with an undulating or similar surface. In a still further specific concept of the invention the inner wall and surface of the pelleter shaft are so formed as to provide for decrease and increase in cross-sectional area or annulus between the shell and the shaft as one moves from the feed toward the discharge end of the apparatus.

It has now occurred to us that an apparatus in which the cross-section area, having as its center point the rotating shaft of the pelleter, is alternately reduced and then increased by an undulating or equivalent surface on the shaft, or on the inner surface of the pelleter shell, or both, will provide alternately a compression and decompression of the particles, e.g., carbon black, undergoing pelleting.

The pelleting of particles as in the case of carbon black to densify the same for compacting purposes and handling with greater ease is known. Improvements in the wet pelleting of particles, e.g., carbon black, with a view to obtaining particle size distribution of narrow range is desired.

An object of this invention is to provide for the pelleting of particles, e.g., carbon black. Another object of the invention is to provide a pelleting apparatus, e.g., for the wet pelleting of particles, e.g., carbon black. A still further object of the invention is to provide method and apparatus for wet pelleting particles, e.g., carbon black, not only to densify or to compact the same but to provide particles having a relatively narrow size distribution range.

Other aspects, concepts, objects and the several advantages of the invention are apparent from a study of this disclosure, the drawing and the appended claims.

According to the invention the mass of particles to be pelleted, together with pelleting fluid, e.g., water, is passed through zones of varying cross-sectional area as the mass moves through the pelleter.

Thus, for example, the annular area between the inner periphery of the pelleter shell and the actual rotating shaft, containing fixed radially extending pins which rotate with the shaft, as seen in cross section taken perpendicularly to the shaft, changes alternately from a relatively small annular area to a relatively large annular area. Thus, according to the invention, as the mass travels through the pelleter, it passes through alternate zones of changing cross-sectional area of the annulus formed in said pelleter and the energy imparted to the pelleting particles, by their passage alternately through compression and relaxation, as they move through the areas of smaller cross-sectional annuli into and through the larger ones, causes the admixing of the pellets or carbon black and the pelleting fluid to be effected in such a manner that the particles are brought together to form wet pellets of particle sizes having a narrow range of size distribution, as desired.

It will be understood by those skilled in the art in the possession of this disclosure having studied the same that the flow of flocculent carbon black and pelleting fluid into the wet pelleter of the invention is normally at a fixed weight rate. Wet pellets are removed from the pelleter normally at this same fixed rate. Thus, the mass entering the pelleter equals the mass exiting the pelleter albeit densification of the mass of particles as these are pelleted takes place.

Also, according to the invention, there is provided an apparatus as described herein, wherein either the surface of the shaft or the inner surface of the shell wall, or both, are so constructed and arranged or shaped as to provide alternately decreasing and increasing cross-sectional annuli, as explained herein.

Referring now to the drawing.

Figure 1:
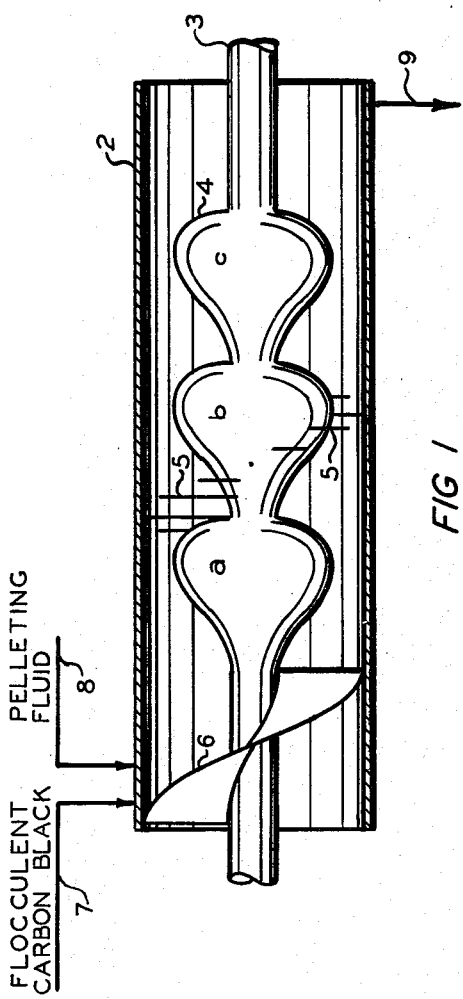
FIG. 1 shows in vertical cross section taken along the axis of a pelleter an embodiment of the invention in which the shaft is undulated, in a manner to be described later.
Figure 3:
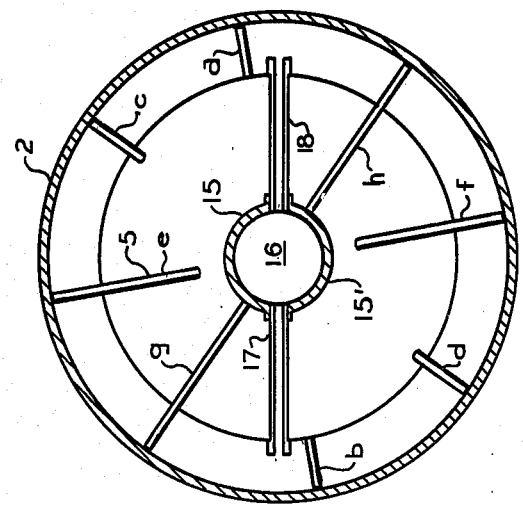
FIG. 3 is a vertical cross section taken at right angles to the axis of the shaft along line 3—3 of FIG. 2.

Referring now to FIG. 1, there is in cylindrical shell 2 a rotatable shaft 3 having undulated surface 4. The surface carries tines 5 which are shown to be helically disposed along the surface of the undulated shaft. Three complete undulations, a, b and c, are shown and auger 6 propels flocculent carbon black introduced at 7 and pelleting fluid, e.g., water, introduced at 8 through the apparatus to wet pellets discharged 9. The wet pellets are conventionally dried.

As the shaft rotates the auger forces pellets and pelleting fluid into compression as the mass moves past and through the constriction provided by undulation a. Then the mass is decompressed as it moves towards the end of undulation a and to the onset of undulation b. Similarly for undulation c. The alternate compression and decompression is like unto a pumping action. It can be seen that the mass is thrice compressed and thrice decompressed before it is discharged from the apparatus.

Viewing the drawing it can be seen that the undulations are irregular in shape in that the upstream facing surfaces are more gradually curved or shaped than are the downstream facing surfaces. In operation, the compression of the carbon black is brought about gradually as the auger 6 forces carbon black toward the annulus formed between the largest portion of the undulated shaft and the shell. Further, the downstream facing surface of the undulation is curved with a smaller radius than that of the upstream facing surface of the undulation resulting in a relatively sudden decompression of the compressed mass as it passes through said annulus. The tines 5 are disposed on the shaft along the surfaces of the undulations and preferably are arranged along the helix.

Only one helix of pins or protion of same have been shown for simplicity. One skilled in the art will know that various arrangements of pins and helices can be used.

Figure 2:
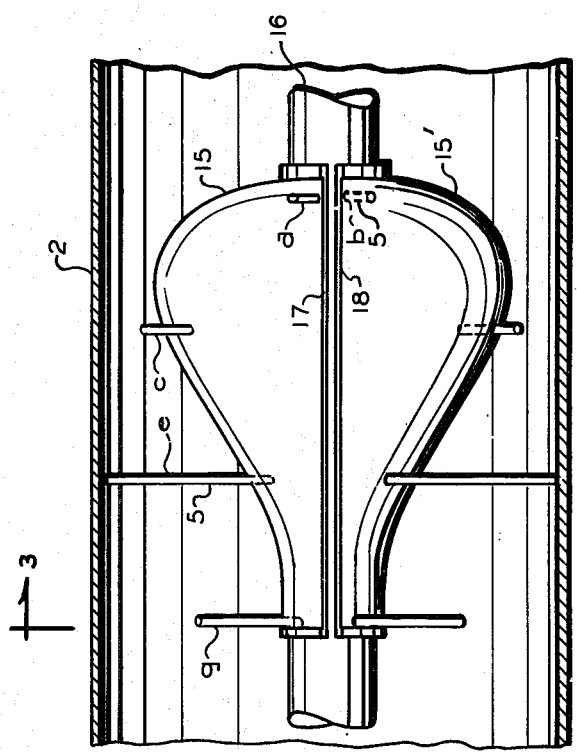
FIG. 2 shows a structure and construction producing an undulated surface on the shaft of the pelleter.

Referring now to FIG. 2, it will be seen that two shaped pieces which are essentially, symetrically formed 15 and 15', are placed about the shaft 16 and held together at their respective flanges 17 and 18. The flanges can be welded or bolted together as desired.

Tines 5 are shown extending from the surface of the flanged together portions toward the inner wall of the shell.

Figure 4:
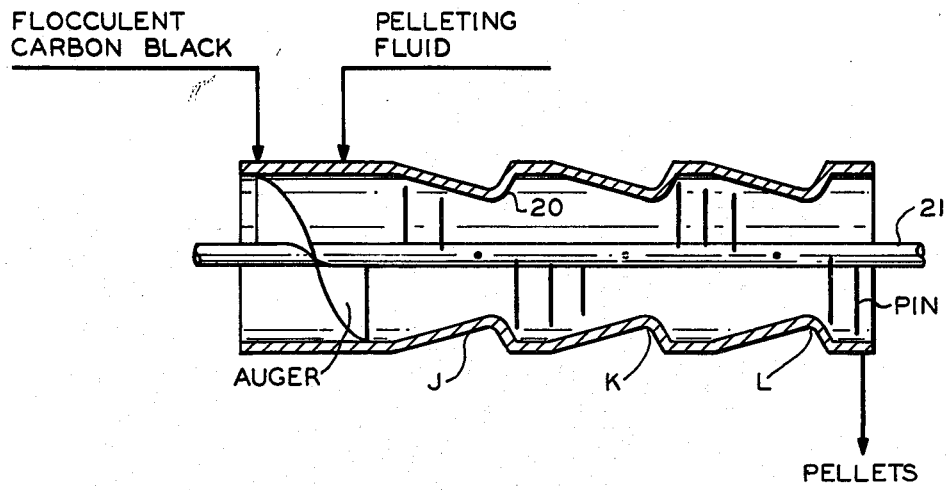
FIG. 4 shows the embodiment of invention in which the inner wall of the shell is undulated.

Referring now to FIG. 4, the inner wall or surface of the shell 20 is undulated as shown at g, h, and l. These undulations coact with pins or tines on shaft 21.

Figure 5:
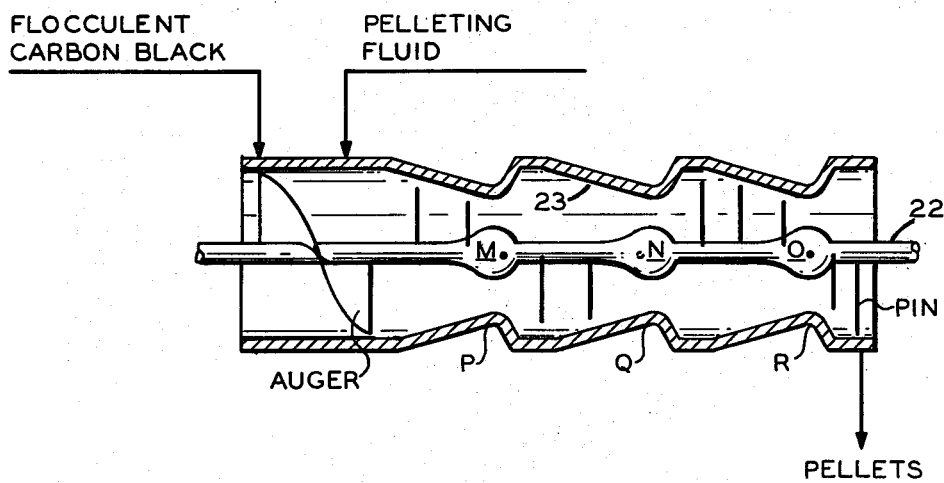
FIG. 5 shows the embodiment of the invention in which both the wall surface and shaft are undulated.

Referring now to FIG. 5, the device shown includes undulations m, n, and o on shaft 22 and undulations p, q, and r on shell wall 23.

The following is a calculated example according to the invention.

| "Calculated Example" | | |
|---|---|---|
| Pelleter Shell: | Specific | Ranges |
| Length, inches, | 98 | 48 to 300 |
| Inner Diameter, inches, | 36 | 18 to 48 |
| Pelleter Shaft (not including auger): | | |
| Length (First to last Pin), inches, | 72 | 24 to 275 |
| Diameter of Shaft, inches, | | [see (a) below] |
| Pins: | | |
| Diameter, inches, | 0.625 | 0.5 to 1.5 |
| Length, inches, | | [see (a) below] |
| Distance of Tip to Inner Shell, inches, | 0.1875 | 0.0625 to 0.5 |
| Centerline Spacing of Pin to Next Adjacent Pin on Same Helix, inches, | 1.5 | 0.75 to 4.5 |
| Azimuthal Angle of Adjacent Pins in Helix, | 22 ½° | 11 ¼° to 45° |
| Number of Helixes (b) | 2 | 2 to 12 |
| Number of Compression/Expansions, [see (a) below] | 3 | 1 to 9 |

(a) The shaft changes diameter along its length at least once, to effect a variable area of cross-section along the annulus between the shaft and the inner periphery of the shell, which causes the desired compression and expansion of the mass in the pelleter. Specifically, the invention, using an about 36 inch inner diameter shell, will have a shaft varying from a maximum diameter of 28 inches to a minimum diameter of 10 inches. This gives an annular clearance between the shell and the shaft of a minimum of 4 inches, and a maximum of 13 inches. The change from the smaller, first diameter of shaft of 10 inches to the larger 28 inch diameter shaft is effected 3 times along the length of the shaft, affording three compression and three expansion zones in the annulus where the pins are affixed to the shaft. The pin clearance of about 0.1875 inches sets the lengths of the radial pins on this shaft.

In the embodiment shown in the drawing, the shaft is preferably "concave" during the increase in radius of the shaft, is preferably "convex" during the locus of maximum shaft radius, and gradually blends back into the smaller radius. Other curvature, or even "straight" line configurations can be used when the shaft changes from one diameter to the next diameter. Each zone (small-large diameter unit) does not have to be exactly the same as the other. And the diameter changes do not necessarily have to be attained in each zone.

The maximum and minumum diameter of the shaft, d, can be expressed in relation to the diameter D of the shell. This can be:

maximum d, about 80% D, and
minimum d, about 25% D.

(b) Symetrically mounted on the shaft; two helixes are 180° apart; three are 120° apart; four are 90° apart, etc.

The specific run given here for illustrative purposes can continuously charge 2200 pounds per hour of flocculent N762 carbon black per hour and 1250 pounds of pelleting water per hour. The pelleting water can contain, e.g., 1.5 wt. percent calcium lignin sulfonate. The shaft runs at 300 RPM, and pelleting is effected at 150° F. The wet pellets are continually passed from this pelleter to a conventional dryer operated to effect drying at 400° F., leaving only 0.5 wt. percent water in the dried pellets.

Reasonable variation and modification are possible within the scope of the foregoing disclosure, drawing and appended claims to the invention the essence of which is that a method for pelleting particles, e.g., carbon black with a fluid, e.g., water has been set forth in which, as described, the pelleting mass is subjected alternately to compression and decompression; and that an apparatus for pelleting particles has been set forth, as described, the apparatus having a pelleting shaft disposed within a shell, at least one of said shaft and the inner wall of said shell being undulated and said shaft surface and inner wall surface cooperating to produce along the axis of the pelleting apparatus alternate zones or sections of compression and decompression.

We claim:

1. A method for pelleting a mass of particles in a pelleting zone, as with a pelleting fluid to compact and to densify the same in said zone, which comprises in said zone passing said particles and fluid through alternate zones of changing cross-sectional area formed in said zone, thereby subjecting said particles to a series of alternating compressions and decompressions.

2. A method according to claim 1 wherein the compressions are effected by passing the mass through a restricted passageway the size of which is alternately gradually continuously reduced and then increased along the line of flow of said mass.

3. A method according to claim 1 wherein said mass is passed into and through a pelleting zone passageway having a rotating shaft therein, said shaft being encompassed within the shell and at least one of said shaft and the inner wall of said shell having an undulated surface, said shaft and inner wall cooperating each with the other to provide a series of alternating places of reduced size in said passageway, thereby causing a series of alternate compressions and decompressions of said mass.

4. A method according to claim 1 wherein carbon black is pelleted with water.

5. A method according to claim 2 wherein carbon black is pelleted with water.

6. A method according to claim 3 wherein carbon black is pelleted with water.

7. A method according to claim 1 wherein the compressions are effected by passing the mass through a restricted passageway the size of which is alternately, gradually reduced and then relatively, abruptly increased along the line of flow of said mass.

8. A method according to claim 3 wherein the tines are provided disposed along the surface of the undulated shaft.

9. A method according to claim 8 wherein the tines are helically disposed along said surface.

10. In an apparatus for pelleting a mass of particles comprising a shell, a shaft disposed within said shell and adapted to rotate therein, at least one of said shaft and the inner wall of said shell having an undulated surface, said inner wall and said shaft cooperating to encompass along said shaft alternate sections or annuli of reduced and increased cross-sectional areas.

11. An apparatus according to claim 10 wherein at least one undulation on said shaft has an upstream facing surface shaped to effect a gradual compression.

12. An apparatus according to claim 11 wherein the downstream facing surface of at least one undulation on said shaft is shaped to effect a sudden decompression.

13. An apparatus according to claim 10 wherein tines are disposed on said undulated surface.

14. An apparatus according to claim 13 wherein said tines are helically disposed.

* * * * *